June 23, 1936.  N. P. HARSHBERGER  2,044,786
ART OF CURING BUILDING MATERIAL
Filed Nov. 22, 1932    2 Sheets-Sheet 1
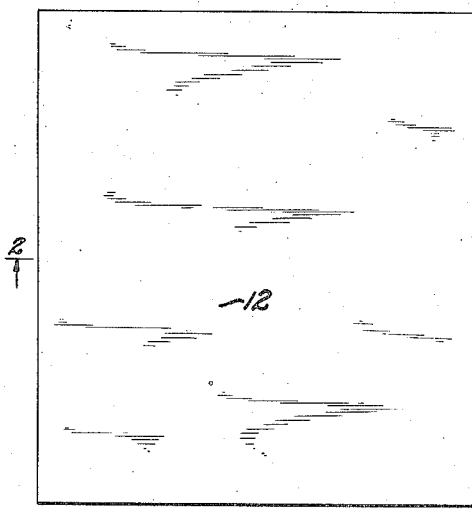
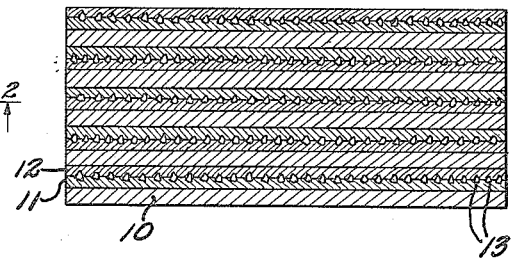
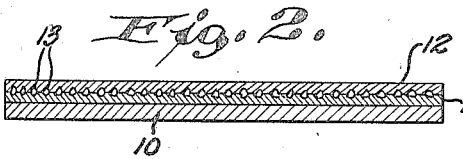
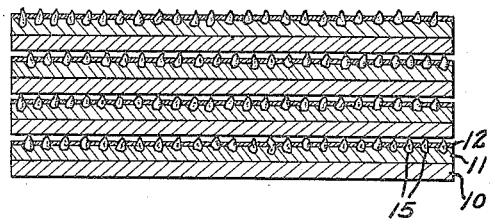
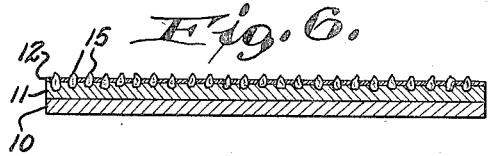
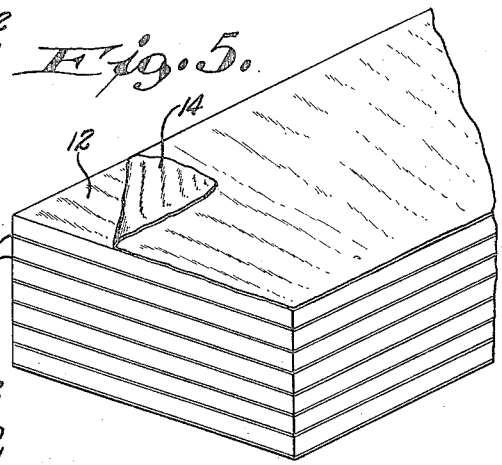
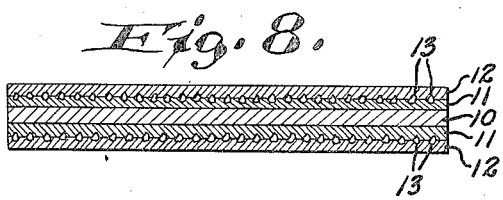
INVENTOR.
Norman P. Harshberger
BY
Morsell Lieber & Morsell
ATTORNEYS.

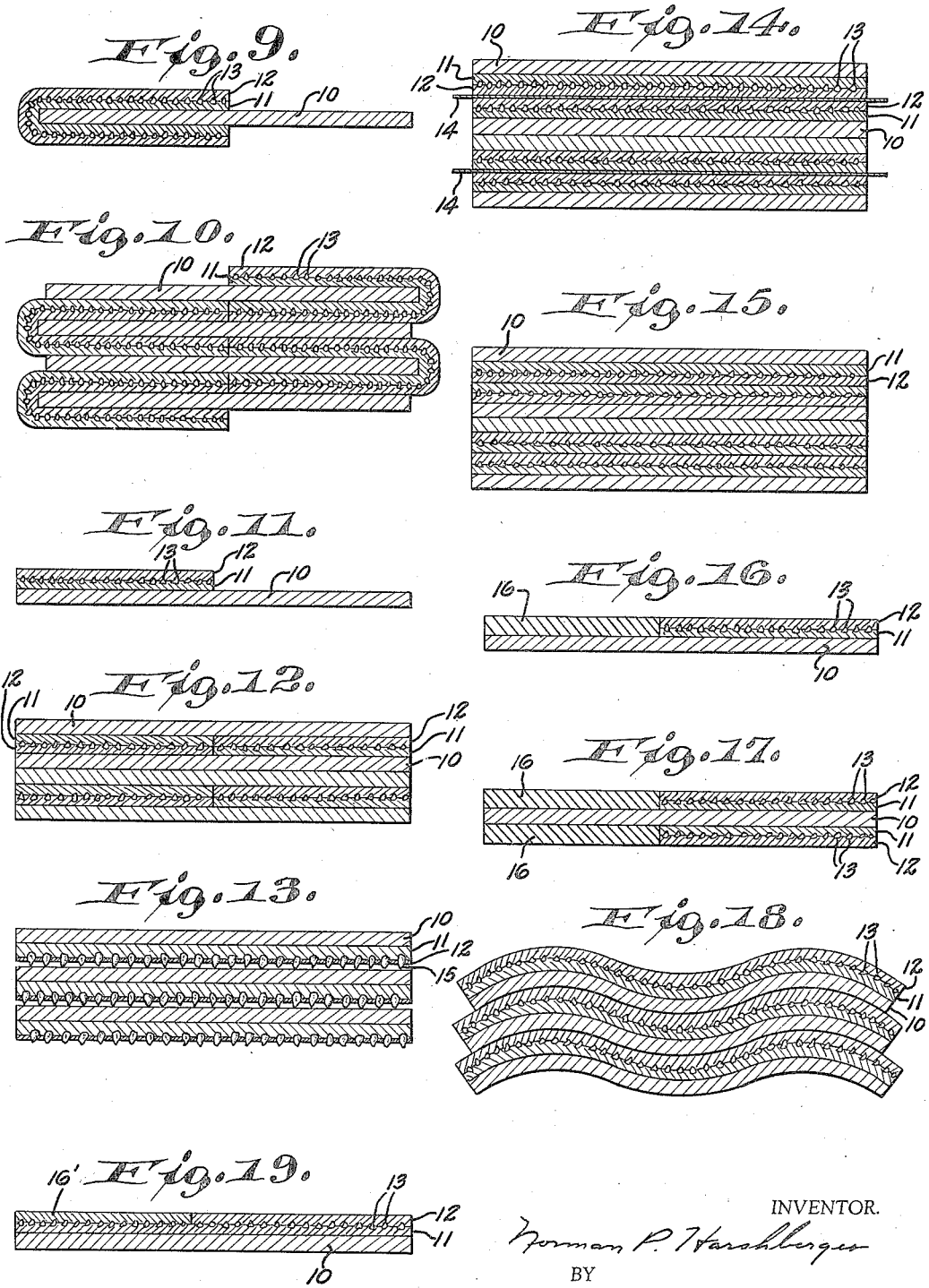

Patented June 23, 1936

2,044,786

UNITED STATES PATENT OFFICE 2,044,786

ART OF CURING BUILDING MATERIAL

Norman P. Harshberger, Scarsdale, N. Y., assignor to Bakelite Building Products Co. Inc., New York, N. Y., a corporation of Delaware Application November 22, 1932, Serial No. 643,891

17 Claims. (Cl. 25—154)

This invention relates in general to improvements in the art of stacking, packaging and curing building materials.

More particularly, this invention has reference to the stacking, packaging, and curing of shingles consisting of a treated fibrous base coated with a layer of any viscous materials, contemplating bituminous or resinous types, and a layer of hydraulic cement wherein the hydraulic cement is caused to adhere to the coated base preferably by a suitable bonding medium.

Rigid shingles, containing cement as a principal ingredient, must be permitted to cure for a period of approximately six weeks and heretofore, during this slow curing process the moisture has been lost before the cement has fully set, thus permitting lime action to take place and causing the formation of an objectionable surface layer of dust. In rigid shingles of the type heretofore made, in order to retain sufficient moisture to produce proper curing, an excessively thick section would have to be employed. Aside from the above-mentioned difficulties the curing of cementitious shingles which are not mounted on a fibrous base presents many other difficulties.

With the type of rigid shingle contemplated by the present invention, however, wherein there is merely a surface layer of cement to be suitably bonded to a saturated fibrous base proper curing also presents difficulties. This is because of the fact that the coefficient of expansion of the cement and of the fabric base is different, and therefore during the curing process and during the setting of the cement, curling is likely to take place if ordinary curing methods are employed for the curing of fibrous based shingles.

It is one of the objects of the present invention to provide a method particularly adapted for the curing of cementitious shingles having a fibrous base as a part thereof in which the curing is so accomplished as to prevent the possibility of the individual shingles curling and to prevent efflorescence and consequent disfiguration and discoloration of the surfaces.

A further object of the invention is to provide a method of curing shingles wherein the moisture which is inherent in the hydraulic cement is retained for a relatively long period to prevent the formation of an objectionable surface layer of dust and to prevent lime action.

A still further object of the invention is to provide a method of curing shingles which includes the prompt stacking of the cut units and the curing of the shingles in stacked i. e. face to face formation, thus enabling the manufacturer to compactly store the shingles during the curing process.

A more specific object of the invention is to provide a method as above described wherein novel separating means are employed between the individual shingles in the stack to prevent adherence of the shingles to one another and wherein said means may include independent separating media and/or separating ingredients in the cement mixture and/or separating ingredients in the material forming the base of the shingles and/or a separating layer adhering to the base of the shingles and/or the formation of the shingle surface or surfaces in such a manner as to prevent adhesion with adjacent shingles.

With the above and other objects in view, the invention consists of the improved art of curing shingles and all its parts and combinations as set forth in the claims, and all equivalents thereof.

In the accompanying drawings in which the same reference numerals designate the same parts in all of the views:

Fig. 1 is a plan view of an individual shingle;

Fig. 2 is an exaggerated sectional view taken on line 2—2 of Fig. 1;

Fig. 3 is a similar section showing a modified form of construction;

Fig. 4 is a cross-sectional view of a stack of shingles illustrating the method of stacking shingles of the type illustrated in Figs. 2 and 3;

Fig. 5 is a perspective view of a stack of shingles showing a modified method of separation;

Fig. 6 is a sectional view similar to Figs. 2 and 3, illustrating a modified form of shingle;

Fig. 7 is a cross-sectional view showing the method of stacking shingles of the type illustrated in Fig. 6;

Fig. 8 is a sectional view similar to Fig. 2 showing still another form of shingle which may be utilized in connection with the improved curing method;

Fig. 9 is a cross section of a partially double surfaced shingle;

Fig. 10 is a cross section showing the method of stacking the shingles of Fig. 9;

Fig. 11 is a cross-sectional view illustrating a shingle which is only partially surfaced on one side;

Fig. 12 is a cross-sectional view showing the method of stacking the shingles of Fig. 11;

Fig. 13 is a cross-sectional view showing a modified method of stacking the shingle of Fig. 6;

Fig. 14 is a cross-sectional view illustrating a modified method of stacking the shingles of Fig. 2;

Fig. 15 is a similar view showing still another method of stacking the shingles of Fig. 2;

Figs. 16, 17 and 19 are cross-sectional views showing other types of shingles which may be cured by the improved method; and Fig. 18 is a cross-sectional view showing the method of stacking curved elements.

Referring more particularly to the drawings, the shingle illustrated in Figs. 1 and 2 consists of a fibrous base 10 which may be paper, felt or the like which has been saturated with a suitable viscous material such as asphalt, and coated with a similar material as at 11. A surface layer 12 of hydraulic cement is formed over the layer 11 and this cement may be an ordinary Portland cement but is preferably a high early strength (accelerated hardening) Portland, for instance, commercial "Incor", or a quick setting Portland, but better still, preference is given to a high alumina cement, for instance, commercial Lumnite, and which also may be quick setting, to obtain certain beneficial characteristics in the carrying out of the invention. In order to obtain a suitable bond between the asphaltic coating 11 and the cement layer 12, some type of bonding medium is preferably employed and in Fig. 2 the bonding medium consists of mineral particles 13, such as for example, slate, embedded in and projecting above the asphalt coating 11. These particles are gripped by the cement 12 when it sets. As illustrated in a modification, Fig. 3, this bonding medium may be a fibrous material such as mineral wool, vegetable fibres or animal hair as at 13'.

In the manufacture of the product it is preferred to form the asphalt coated base as a web, and to add mineral particles or other bonding medium to the surface of said web. The web is then preferably cut to form individual shingle units, and these units are then coated with a layer of hydraulic cement. It is, however, possible to coat the entire web with cement prior to the cutting. With either method, however, the individual shingles are formed before the cement has set, and the shingle is then completed except for the curing process which forms the subject matter of the present invention.

Ordinarily, the curing process is relatively slow, and the moisture which is inherent in the hydraulic cement, evaporates before the cement has had an opportunity to properly hydrate and set, thus causing the formation of an objectionable dust on the surface of the article, and with certain hydraulic cements permitting lime action to take place. One of the important features of the present invention relates to the prevention of the rapid loss of moisture from the cement.

The above is accomplished by immediately stacking i. e. arranging face to face, the cut and cement coated shingles one on another in the manner indicated in Figs. 4 and 15 and permitting the shingles to cure while in stacked formation. With this arrangement the cement surface is not exposed to the air, except such as may enter between the individual shingles and the moisture is therefore retained for a relatively long period and until after the setting of the cement has taken place. It has been found that when the individual shingles are separated, after the curing has been sufficiently completed, that various surface formations ranging from smooth effects to irregular or mottled effects, in which no two elements have exactly similar formations, may be obtained. The degree of the effects so produced can be controlled by proper surface preparation and by regulation of the stacking and curing operations.

In order to obtain the above advantages of stacking, however, it is necessary to cope with the problem of preventing the shingles from becoming bonded to one another in the stack. The present method therefore includes as an important feature, the use of a suitable separating means to prevent the cement coating of one shingle from becoming bonded to the shingle above. One form of separating medium is provided by mixing with the hydraulic cement, before its application to the shingles, ingredients which come to the surface of the cement and form a separating film thereon. For this purpose it is preferred to mix with the cement, fractions of one to ten percent of such ingredients, and these ingredients may be material such as synthetic resin, asphalt, wax, or oil such as linseed or tung oil. These materials will, as before mentioned, appear on the surface of the cement when it sets, and will form the desired separating film.

In addition to the separating means above defined or as a substitute therefor, the back of each shingle may be coated with a suitable separating layer or have combined with its composition a suitable separating substance. The material comprising this layer or separating substance may be any that will not combine with the cement and which will prevent union with the cement of the next contacting shingle. For this purpose suitable waxes or oils may be employed.

Another important form of separating means which is contemplated by the present invention is the use of a flexible vehicle such as paper or cloth treated with a suitable separating medium such as wax or oil. This type of flexible separating medium is used between each of the shingles in the stack and is designated by the numeral 14 in Figs. 5 and 14. With the flexible type of separator 14, a certain amount of moisture from the hydraulic cement will be absorbed by the separator, and the latter will shrink and form wrinkles. Due to the weight of the stack on the separator, these wrinkles will be pressed into the cement, and as the latter sets, the surface will be formed with wrinkles therein simulating the grain of wood. After the curing process has taken place, the separating pieces 14 may be readily removed because of the non-adherence of the cement to the separator itself.

An additional method of preventing adherence of the individual shingles to one another while stacked for curing is illustrated in Figs. 6 and 7. When this method is employed the crushed mineral or pebbles such as that used at 13 in Fig. 2, is of a coarser nature so that it projects above the cement layer 12, as at 15. When shingles of this type are stacked for curing, the projecting mineral particles 15 will tend to slightly elevate the shingle above to prevent contact with the setting cement, as indicated in Figs. 7 and 13.

In Fig. 8 a shingle is illustrated which is identical to that illustrated in Fig. 2 except that the asphalt coating 11, mineral 13, and cement coating 12 is applied on both faces of the fabric base 10 to provide a reversible shingle. Fig. 9 illustrates a partially coated shingle wherein only the portion to be exposed to the weather has been surfaced. The method of stacking these shingles is shown in Fig. 10, and a suitable separating medium as before described may be employed.

The type of shingle illustrated in Fig. 11 is surfaced in the manner described in connection with Fig. 2 except that the surfacing is only on the portion of the shingle which is to be exposed in assembly. This type of shingle may be stacked in the manner indicated in Fig. 12, a suitable separating means being employed.

As it is sometimes more practical in packaging to have the top and bottom faces of an article lying in flat planes it may be arranged in the manufacturing process to take a shingle as shown in Fig. 11 and apply to that portion comprising the unsurfaced part, a layer of bituminous material 16 as shown in Fig. 16.

Fig. 17 shows an element surfaced and coated on both faces to obtain the same result as in Fig. 16.

While nearly all of the figures illustrated show elements of a flat type, this in no way should be construed to mean that shaped elements are not contemplated by this invention. One of the shaped elements of this type is illustrated in stack formation in Fig. 18.

The shingle illustrated in Fig. 19 is also designed to obtain the result of Fig. 16, but in this form the coating of asphalt 11 and the grit 13 cover the entire surface. The cement layer 12 is used only on the portion to be exposed and the remainder of the shingle is leveled with a layer of bituminous material 16'.

As an additional step in any of the above methods the cut and stacked elements may be subjected to pressure for the purpose of extruding such surplus hydraulic cement as may be desired and suitable means may be then employed for removing the surplus cement from the edges of the stack. This may be done by any ordinary scraping step. The scraping step may be also applied to the surface of individual elements to remove surplus material, if so desired. Also where it is desired to have the coating project beyond or over the edges of the stacked shingles and yet prevent adhesion of the adjacent shingles in the stack, the surplus cement may be received by separators having portions projecting beyond the shingle edges. This type of separator is indicated at 14 in Fig. 14 and may be employed in any of the stack arrangements disclosed.

Where pebbles or the like are used as separating means, as in Fig. 7, the edges of the elements may be protected by any suitable means to prevent the evaporation of moisture.

A further very material use of this novel curing method is in overcoming loss of color where the cement is mixed with coloring pigments, and the combination of cement and coloring pigments is therefore contemplated by this invention.

An additional advantage gained from the use of the viscous materials described heretofore in combination with the cement is that of preventing lime action from taking place, thus preventing efflorescence and any other disfiguration or discoloration to the surface by precluding the evaporation of moisture.

From the above it may be seen that a very desirable method of curing shingles has been described wherein a fibrous based cement coated shingle is cured in stacked formation to prevent curling of the shingles and to prevent loss of moisture and wherein means are utilized as a step in the method of preventing the singles from becoming bonded to one another during the curing process.

What I claim is:

1. The method of curing cement shingles comprising mixing with the cement before its application to the shingles an ingredient comprising an element of the group composed of synthetic resin, asphalt, wax and oil which will appear on the surface of the cement after its application to the shingles to form a separating layer, stacking the shingles before the cement has set, and effecting curing of the shingles while in stack formation.

2. The method of curing cement shingles comprising mixing with the cement before its application to the shingles a fraction of one percent to five percent of water repellant ingredients which will appear on the surface of the cement after its application to the shingles to form a separating layer, stacking the shingles before the cement has set, and effecting curing of the shingles while in stacked formation.

3. The method of manufacturing fibrous based cement shingles comprising forming the shingles with particles projecting above the cement surface, said particles comprising coarse individual pieces, stacking the shingles before the cement has set, the projecting particles causing spacing of adjacent shingles to prevent bonding of the cement of one shingle with the fibrous base of the shingle thereadjacent, and effecting curing of the shingles while in stack formation.

4. The method of manufacturing cement coated shingles comprising coating a saturated fabric base with water proofing material, applying a layer of relatively coarse mineral particles to the coated base in such a manner that the particles will project a substantial distance above the coating, applying a relatively thin layer of cement over the water proofing coating in such a manner as to provide for projection of the mineral particles above the surface of the cement layer, stacking the shingles before the cement has set, the projecting particles causing spacing of adjacent shingles to prevent bonding of the cement of one shingle with a shingle thereadjacent, and effecting curing of the shingles while in stack formation.

5. The method of curing fibrous based cement coated singles comprising stacking said shingles before the cement has set, preventing the bonding of the cement coating of each shingle with the adjacent shingle while stacked, exerting pressure on the stack to extrude surplus cement, removing the extruded cement from the edges of the stack, and effecting curing of the shingles while in stack formation.

6. The method of curing colored cement building elements comprising mixing with the cement before its application to the elements coloring pigments and water repellant ingredients which will appear on the surface of the cement after its application to the elements to form a separating layer, stacking the elements before the cement has set, and effecting curing of the elements while in stack formation to prevent curling, said ingredients preventing consequent dusting and efflorescence of the element surface.

7. The method of curing fibrous based cement coated shingles comprising stacking said shingles before the cement has set with the fibrous base of one shingle adjacent the cement coating of the next shingle, preventing the bonding of the cement coating of each shingle with the adjacent shingle while stacked by including with said base a water repellant material, and effecting curing of the shingles while in stack formation to aid in preventing curling and dusting efflorescence.

8. The method comprising, forming thin fibre and hydraulic cement shingles, including a member of the group of bituminous and resinous materials to substantially prevent bonding of the cementitious faces when the shingles are stacked, stacking said shingles before the cement has set, and effecting curing of the shingles while in stack formation to prevent curling of the shingles and improper hydration of the hydraulic cement with its consequent dusting.

9. The method comprising providing a fibrous sheet to act as a base for a hydraulic cement coating, securing to said base a high early strength hydraulic cement coating to form composite material, arranging a plurality of units of said composite material face to face and effecting curing of the units while in said formation to aid in preventing curling thereof and dusting efflorescence of the cement surface.

10. The method comprising forming thin fibrous based shingles with an unset hydraulic cement coating, including with the shingles during manufacture an ingredient comprising a synthetic resin to substantially prevent bonding of the cement face of one shingle with an adjacent shingle when the shingles are arranged in face to face relationship, and subsequently arranging a plurality of said shingles face to face before the cement has set, and effecting curing of the shingles while in said formation to prevent curling thereof.

11. The method of manufacturing cement coated shingles comprising providing a fibrous sheet base to support a hydraulic cement coating, securing to said base a hydraulic cement coating and a layer of granular particles uncoated portions of which project beyond the cement coating, arranging a plurality of said coated bases in face to face relationship with the projecting particles of one shingle in contact with the base of another to substantially prevent bonding of the cement of one shingle with a shingle thereadjacent and effecting curing of the shingles while in said face to face relationship.

12. The method comprising providing fibrous sheet material and cutting and coating said material with a layer of cement to form cement coated elements, adding as an ingredient of the coated elements a member of the group of resinous and bituminous materials and thereby forming a separating surface between adjoining elements in curing and substantially preventing bonding therebetween, arranging the coated elements before the cement layer has set with their adjacent faces in face to face relation, and curing the elements so arranged to aid in preventing displacement of the coated elements from their desired form and dusting of their cement layers.

13. The method comprising forming shingles with a granular surfaced fibrous base and a surfacing comprising hydraulic cement, adding as an integral part of the base, a member of the group of resinous and bituminous materials thereby forming a separating surface between adjoining shingles in curing and substantially preventing bonding therebetween, arranging the cement surfaced shingles before the cement has set with their adjoining faces in face to face relation, and curing the shingles as arranged to substantially prevent curling thereof and dusting of the cement faces.

14. The method of making and curing cement layered elements, comprising forming sheet-like elements with a pliable base and a cementitious layer, adding as an ingredient of the cementitious elements a member of the group of resinous and bituminous materials to form a separating surface between adjoining elements in curing and substantially prevent bonding therebetween, arranging the elements with their adjoining faces in face to face relation while the cementitious layers are plastic, and curing the elements so arranged to aid in preventing displacement of the cementitious elements from their desired form and dusting of their cement layers.

15. The method of manufacturing cement coated shingles comprising applying to a base web a layer of a substance suitable for the anchoring of an additional coating and cutting and coating the base material over the anchoring substance with hydraulic cement, to form composite units, providing the base material with an ingredient to form a separating surface between adjacent units in curing, arranging the cut units in face to face relationship before the hydraulic cement coating has set and curing the units while so arranged.

16. The method of making and curing cementitious building units comprising forming fibrous sheet material and dividing and coating said material with hydraulic cement, to form composite units comprising a layer of fibrous material and a layer of plastic hydraulic cement, incorporating integrally with the composite units means providing a separating surface at a face of the composite units to aid in preventing bonding of the cement layer of one unit with a face of an adjoining unit in curing, arranging a plurality of the composite units before the hydraulic cement has set to form a compact package and arranging said units in face to face relation with adjoining faces contacting each other, and curing the units while so formed and arranged to aid in preventing displacement of the elements from their desired form and dusting of the cement layers.

17. The method of forming and curing sheet-like cementitious building elements comprising mixing cementitious ingredients, adding to the mix a substance comprising a member of the group composed of resinous and bituminous materials, forming sheet-like elements with a surface layer created by the added substance and permitting the cementitious material to set and cure, said surface layer aiding in the prevention of dusting of the cementitious material during curing.

NORMAN P. HARSHBERGER.